US006240752B1

(12) United States Patent
Larsen et al.

(10) Patent No.: US 6,240,752 B1
(45) Date of Patent: Jun. 5, 2001

(54) LATCH SYSTEM FOR MOVABLE CLOSURE

(75) Inventors: Marvin L. Larsen, New Hampton, IA (US); Ken L. McConnell, Warrensburg, MO (US); Kevin P. Eschweiler; Theresa M. Glaser, both of New Hampton, IA (US); Chris J. Wildeboer, Alta Vista, IA (US)

(73) Assignee: Tri/Mark Corporation, New Hampton, IA (US)

(*) Notice: Subject to any disclaimer, the term of this patent is extended or adjusted under 35 U.S.C. 154(b) by 0 days.

(21) Appl. No.: 09/238,304

(22) Filed: Jan. 28, 1999

(51) Int. Cl.[7] .................................................. B60R 25/02

(52) U.S. Cl. ................ 70/208; 292/336.3; 292/DIG. 31; 292/216

(58) Field of Search ...................... 70/208; 292/DIG. 31, 292/216, 336.3, DIG. 3, DIG. 23

(56) References Cited

U.S. PATENT DOCUMENTS

| | | | |
|---|---|---|---|
| 3,044,815 | * 7/1962 | Soss | 292/DIG. 31 X |
| 3,698,215 | * 10/1972 | Truhon | 292/DIG. 31 X |
| 4,116,027 | * 9/1978 | Tannery | 70/208 X |
| 4,480,451 | * 11/1984 | Fujiya | 70/208 X |
| 4,578,968 | * 4/1986 | Messier, Jr. | 70/208 |

(List continued on next page.)

FOREIGN PATENT DOCUMENTS

| | | |
|---|---|---|
| 1 552 984A | 9/1979 | (GB) . |
| 2 210 339A | 6/1989 | (GB) . |

*Primary Examiner*—Suzanne Dino Barrett
(74) *Attorney, Agent, or Firm*—Wood, Phillips, VanSanten, Clark & Mortimer

(57) ABSTRACT

A latch system for a closure element that is slidable relative to a mounting frame between first and second positions. The mounting frame has a strike element to be engaged to releasably maintain the closure element in a first position. The latch system has a first frame part, a first handle that is mounted to the first frame part for movement between first and second positions, and a first latch assembly having a latched state and a released state. The first latch assembly in the latched state is capable of cooperating with the strike element to selectively prevent the closure element from moving from the first position for the closure element into the second position for the closure element. The first latch assembly in the released state permits the closure element to move from the second position for the closure element into the first position for the closure element and from the first position for the closure element into the second position for the closure element. As the first handle is moved from the first position for the first handle into the second position for the first handle, the first handle causes the first latch assembly to change from the latched state into the released state. The first handle is movable from the first position for the first handle into the second position for the first handle by exerting a force on the first handle in a first direction. The first frame part, first handle, and first latch assembly are capable of being mounted in an operative position on the closure element so that a force exerted on the first handle in the first direction to move the first handle from the first position for the first handle into the second position for the first handle has at least a component thereof tending to move the closure element from the first position for the closure element toward the second position for the closure element. With the first frame part, first handle, and first latch assembly in the operative position on the closure element with the closure in the first position for the closure element and the latch assembly in the latched state, a user can exert a force on the first handle in the first direction that both a) changes the first latch assembly from the latched state into the released state and b) urges the closure element from the first position for the closure element towards the second position for the closure element.

35 Claims, 13 Drawing Sheets

U.S. PATENT DOCUMENTS

| | | | | |
|---|---|---|---|---|
| 4,676,081 | * | 6/1987 | Craig | 70/208 X |
| 4,898,408 | * | 2/1990 | Hauber | 70/208 X |
| 5,127,686 | * | 7/1992 | Gleason et al. | 70/208 X |
| 5,820,174 | * | 10/1998 | Parikh et al. | 70/208 X |
| 5,927,773 | * | 7/1999 | Larsen et al. | 292/337 |
| 5,941,104 | * | 8/1999 | Sadler | 70/208 |

* cited by examiner

LATCH SYSTEM FOR MOVABLE CLOSURE

BACKGROUND OF THE INVENTION

1. Field of the Invention

This invention relates to latch systems of the type used on movable closures and, more particularly, to a latch system that releasably maintains a movable closure in at least one position therefor and through which release and repositioning of the closure element to another position therefor are facilitated.

2. Background Art

Sliding closure elements are used in a wide range of environments. These closure elements are commonly used on delivery vehicles to provide an opening for a user thereof to conveniently access the storage, or front cab, area of the vehicle to facilitate loading and unloading thereof.

In this environment, it is common for users to be carrying one or more packages as the closure element is being manipulated. For example, it is common for a user to unlatch and open one closure element to access a package in one part of the vehicle and, while carrying that package, close and latch the one closure element and unlatch and open another closure element to access a package at another location in the vehicle. It is thus a goal of designers and manufacturers of latch systems and closure elements for this type of vehicle to facilitate safe, one-handed operation of the closure elements as latch systems thereon are latched and unlatched and the closure elements are opened and closed.

It is known to provide latch assemblies which are operable by a graspable handle that is rotatable about a fore and aft axis. In one motion, the user torques the handle to place the latch assembly in an unlatched/released state and in a separate motion translates the closure element from a closed position in a path, that is transverse to the pivot axis of the handle, to an open position. The two separate actions required by the user may make unlatching of the latch assembly and opening of the closure element awkward to carry out.

Another consideration in the design of this type of closure element and latch system is that the entire mechanism may be subjected to relatively severe force application in use. A user balancing a package in one hand may tend to exert a large force in both opening and closing the closure element. Often users of this type of closure element can be seen "slamming" the closure element into both the open and closed positions therefor. Since this manipulation is effected primarily through the handle, depending upon the relationship between the handle and the other working components of the latch mechanism, components of the latch mechanism may be highly stressed and prone to failure. This problem may become aggravated in the event that the closure element sticks, as may occur after excessive cycling of the closure element and/or in the event that damage is somehow inflicted thereon in use.

Designers and manufacturers of this type of closure element and latch system are also concerned with a number of other design considerations. It is commonly desirable to allow the handle to be repositioned in use by exerting a relatively constant force thereon throughout its operating range. Since it is common to spring bias the handle to one position therefor, a variable spring force may result as the handle is repositioned.

Designers and manufacturers also strive to design strike elements that function effectively and positively hold the closure element in a particular state, yet which are not obtrusive so as to be prone to being snagged by a user's clothing or other foreign objects. This is particularly a problem in the field of delivery vehicles in which users repeatedly enter and exit the vehicle to perform their jobs.

Another problem with this type of system, particularly in the delivery vehicle environment, is that of locking and unlocking the latch system while bearing packages. Typically, a lock system, used to maintain the latch system in the locked state, is incorporated which is manipulated separately from the handle that changes the latch assembly between the latched and unlatched states. This can make one-handed operation of the latch system, lock system and closure element difficult.

Conventional locking systems may also be constructed so that it is difficult to ascertain that the latch assembly is in a locked state. The user will often set the locking system and undertake trial and error to make certain that the locking system is properly operating. This may require that the user place the latch assembly in the released state and try to open the closure element. It is possible that if the closure element is for some reason jammed, the user may mistakenly conclude that the latch system is in the locked state.

Another potential problem with conventional latch systems is that with the latch system in the locked state, there may be a rigid interconnection between inside and outside components on the closure element which substantially fix the position of the outside handle. Attempted operation of the outside handle with the latch system in the locked state may impart damaging forces to components of the latch assembly or other parts of the mechanism. It is possible that the user of the system may conclude in an attempted operation thereof that the handle is jammed rather than locked, causing the user to exert an extraordinarily large force on the handle, with potentially damaging results.

Designers and manufacturers of this type of system also strive to produce handles that are accessible to be positively manipulated, yet which do not lend themselves to be grasped in such a manner as might tempt an individual to bear his/her own weight, i.e. to hang on the vehicle through the handle.

In some environments, it is desirable that the closure element be positively and releasably latched in each of two different positions, while at the same time allowing a user to conveniently, as with one hand, unlatch and draw the closure from each of the two positions to the other.

SUMMARY OF THE INVENTION

In one form, the invention is directed to a latch system for a closure element that is slidable relative to a mounting frame between first and second positions. The mounting frame has a strike element to be engaged to releasably maintain the closure element in a first position. The latch system has a first frame part, a first handle that is mounted to the first frame part for movement between first and second positions, and a first latch assembly having a latched state and a released state. The first latch assembly in the latched state is capable of cooperating with the strike element to selectively prevent the closure element from moving from the first position for the closure element into the second position for the closure element. The first latch assembly in the released state permits the closure element to move from the second position for the closure element into the first position for the closure element and from the first position for the closure element into the second position for the closure element. As the first handle is moved from the first position for the first handle into the second position for the first handle, the first handle causes the first latch assembly to change from the latched state into the released state. The first handle is movable from the first position for the first handle into the second position for the first handle by exerting a force on the first handle in a first direction. The first frame part, first handle, and first latch assembly are capable of being mounted in an operative position on the closure element so that a force exerted on the first handle in the first direction to move the first handle from the first position for the first handle into the second position for the first handle has at least a component thereof tending to move the closure element from the first position for the closure element toward the second position for the closure element. With the first frame part, first handle, and first latch assembly in the operative position on the closure element with the closure in the first position for the closure element and the latch assembly in the latched state, a user can exert a force on the first handle in the first direction that both a) changes the first latch assembly from the latched state into the released state and b) urges the closure element from the first position for the closure element towards the second position for the closure element.

The latch system may include a strike element to be releasably engaged by the first latch assembly.

The latch system may be provided in combination with a mounting frame and a closure element which is mounted for sliding movement relative to the mounting frame between first and second positions. The first frame part, first handle, and first latch assembly are mounted in an operative position on the closure element. The strike element is attached to the frame to be releasably engaged by the first latch assembly.

In one form, the closure element is translatable in a first line between the first and second positions for the closure element. The first handle is pivotable about a first axis in moving between the first and second positions for the first handle, with the first axis and first line being substantially orthogonal to each other.

In one form, the first line extends in one of a horizontal and vertical direction and the first axis extends substantially in the one of the horizontal and vertical directions.

In another form, the first line extends in one of a horizontal and vertical direction and the first axis extends substantially in the other of the horizontal and vertical directions.

A second latch assembly may be provided having a latched state and a released state. The second latch assembly in the latched state for the second latch assembly is capable of cooperating with a second strike element on the frame to selectively prevent the closure element from moving from the second position for the closure element into the first position for the closure element. The second latch assembly in the released position for the second latch assembly permits the closure element to move from the first position for the closure element into the second position for the closure element and from the second position for the closure element into the first position for the closure element.

In one form, as the first handle is moved from the second position for the first handle into the first position for the first handle, the first handle causes the second latch assembly to change from the latched state for the second latch assembly into the released state for the second latch assembly. The first handle is movable from the second position for the first handle into the first position for the first handle by exerting a force on the first handle in a second direction. The first frame part, first handle, first latch assembly, and second latch assembly are capable of being mounted in an operative position on the closure element so that a force exerted on the first handle in the second direction to move the first handle from the second position for the first handle into the first position for the first handle has at least a component thereof tending to move the closure element in the second position for the closure element towards the first position for the closure element. With the first frame part, first handle, first latch assembly, and second latch assembly in the operative position on the closure element, the closure element in the second position for the closure element and the second latch assembly in the latched state for the second latch assembly, a user can exert a force on the first handle in the second direction that both a) changes the second latch assembly from the latched state for the second latch assembly into the released state for the second latch assembly and b) urges the closure element from the second position for the closure element towards the first position for the closure element.

The latch system may further include a second frame part and a second handle that is mounted to the second frame part for movement between first and second positions. As the second handle is moved from the first position for the second handle into the second position for the second handle, the second handle causes the first latch assembly to change from the latched state for the first latch assembly into the released state for the first latch assembly.

The second handle may be movable from the first position for the second handle into the second position for the second handle by exerting a force on the second handle in a second direction. The first frame part, first handle, second frame part, second handle, and first latch assembly are capable of being mounted in an operative position on the closure element so that a force exerted on the second handle in the second direction to move the second handle from the first position for the second handle into the second position for the second handle has at least a component thereof tending to move the closure element from the first position for the closure element towards the second position for the closure element. With the first frame part, first handle, second frame part, second handle, and first latch assembly in the operative position on the closure element with the closure element in the first position for the closure element and the latch assembly in the latched state, a user can exert a force on the second handle in the second direction that both a) changes the first latch assembly from the latched state into the released state and b) urges the closure element from the first position for the closure element towards the second position for the closure element.

The first handle may be pivotable around a first axis in moving between the first and second positions for the first handle, with the second handle being pivotable around a second axis in moving between the first and second positions for the second handle. The first and second axes may be non-parallel and, in one form, are orthogonal to each other.

The first and second handles may be interconnected, each to the other, so that movement of the first handle from the first position for the first handle into the second position for the first handle causes the second handle to move from the first position for the second handle into the second position for the second handle and movement of the second handle from the first position for the second handle into the second position for the second handle causes the first handle to move from the first position for the first handle into the second position for the first handle.

The first handle may be selectively repositionable relative to the first frame part and the second handle between a normal position and a locked position so that with the first handle in the locked position, the first handle is disengaged from the second handle so that the second handle can be moved from the first position for the second handle into the second position for the second handle without causing the first handle to be moved from the first position for the first handle into the second position for the first handle.

In one form, with the first handle in the locked position, the first frame part and first handle cooperate to prevent the first handle from moving between the first and second positions for the first handle.

In one form, with the first handle in the locked position, the second handle is disengaged from the first latch assembly so that the second handle can be moved from the first position for the second handle into the second position for the second handle without causing the first latch assembly to change from the latched state into the released state.

The second frame part may have an actuator that is operable to reposition the first handle between the normal and locked positions. The actuator may be key operable.

The latch system may be provided in combination with a closure element having first and second oppositely facing sides, with the first frame part mounted on the first oppositely facing side of the closure element and the second frame part mounted on the second oppositely facing side of the closure element.

The first handle may be translatable between the normal and locked positions.

The second handle may abut to the first frame part with the second handle in at least one of the first and second positions for the second handle.

The second handle may abut to the first frame part with the second handle in each of the first and second positions for the second handle.

The first frame part may have a recess in which at least a part of the second handle resides. The recess may be cup-shaped to receive a part of a user's hand which engages the second handle to reposition the second handle between the first and second positions for the second handle.

In one form, the strike element is a strike bolt having a central axis and axially spaced ends. A plate assembly with spaced wall portions may be provided between which the strike bolt extends so that each axially spaced end of the strike bolt is adjacent to one of the wall portions.

A cantilevered surface may shield the first handle to avoid inadvertent repositioning of the first handle between the normal and locked positions.

A spring assembly may be provided to urge the second handle to a neutral position between the first position for the second handle and the second position for the second handle.

In one form, the second handle has a first edge and the spring assembly has a plate and first and second spaced springs which act between the first frame part and plate to urge the plate in one direction against the second handle so that as the first handle is moved from the neutral position towards one of the first and second positions for the second handle, the first edge acts against the plate to urge the plate oppositely to the one direction.

In one form, the plate has a midpoint that is spaced equidistantly from the first and second springs and the first edge moves closer to the midpoint as the second handle moves from the neutral position towards the one of the first and second positions for the first handle.

The springs may be coil springs.

In one form, the first handle has a U-shaped configuration with a base and spaced legs and the spaced legs are pivotably connected to the first frame part to allow the first handle to pivot between the first and second positions for the first handle.

The invention is also directed to a latch system for a closure element that is movable relative to a frame between first and second positions, with the frame having a strike element to be engaged to releasably maintain the closure element in the first position. The latch system has a first frame part, a first handle that is mounted to the first frame part for movement between first and second positions, and a first latch assembly having a latched state and a released state. The first latch assembly in the latched state is capable of cooperating with the strike element to selectively prevent the closure element from moving from the first position for the closure element into the second position for the closure element. With the first latch assembly in the released position the closure element can move from the second position for the closure element into the first position for the closure element and from the first position for the closure element into the second position for the closure element. As the first handle is moved from the first position for the first handle into the second position for the first handle, the first latch assembly changes from the latched state into the released state. The first handle is selectively repositionable between a normal position and a locked position. The first handle is movable between the first and second positions for the first handle with the first handle in the normal position. The first handle cooperates with the first frame part so that the first frame part prevents the first handle from moving between the first and second positions with the first handle in the locked position.

In one form, the first handle has an exposed portion to be engaged by a user that is a) pivotable about an axis in a first path to move the handle between the first and second positions for the first handle and b) translatable in a second path to reposition the first handle between the normal and locked positions.

The first and second paths may cooperatively define a T shape.

A second handle may be provided that is mounted to the second frame part for movement between first and second positions. As the second handle moves from the first position for the second handle into the second position for the second handle, the second handle causes the first latch assembly to change from the latched state into the released state.

With the first handle in the normal position, the first and second handles are interconnected, each to the other, so that movement of the first handle from the first position for the first handle into the second position for the first handle causes the second handle to move from the first position for the second handle into the second position for the second handle, and movement of the second handle from the first position for the second handle into the second position for the second handle causes the first handle to move from the first position for the first handle into the second position for the first handle. With the first handle in the locked position, the second handle is disengaged so that the second handle can be moved from the first position for the second handle into the second position for the second handle without causing the first latch assembly to change from the latched state into the released state.

DETAILED DESCRIPTION OF THE DRAWINGS

Figure 1:
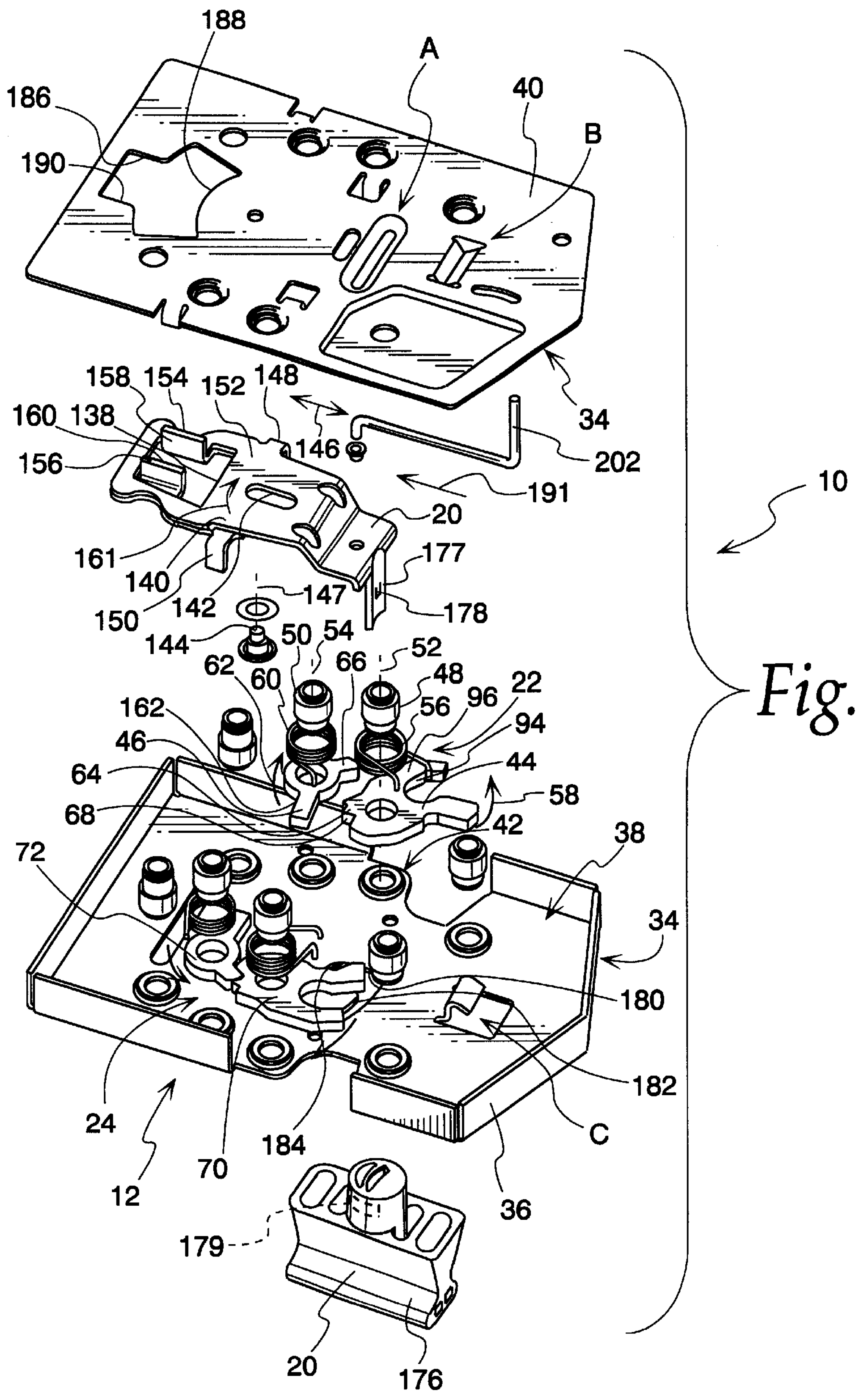
FIG. 1 is an exploded, perspective view of an interior portion of a latch system, according to the present invention, and including a first frame part, a first handle, and first and second latch assemblies.

A latch system, according to the present invention, is shown in the drawings at 10. The latch system 10 is made up of an interior latch portion 12 and an exterior latch portion 14 which interconnect through a closure element 16. The latch portions 12, 14 are interconnected in such a manner that a handle 18 on the exterior latch portion 14 and a handle 20 on the interior latch portion 12 can each be repositioned to selectively operate spaced latch assemblies 22, 24 mounted on the interior latch portion 12.

Figure 4:
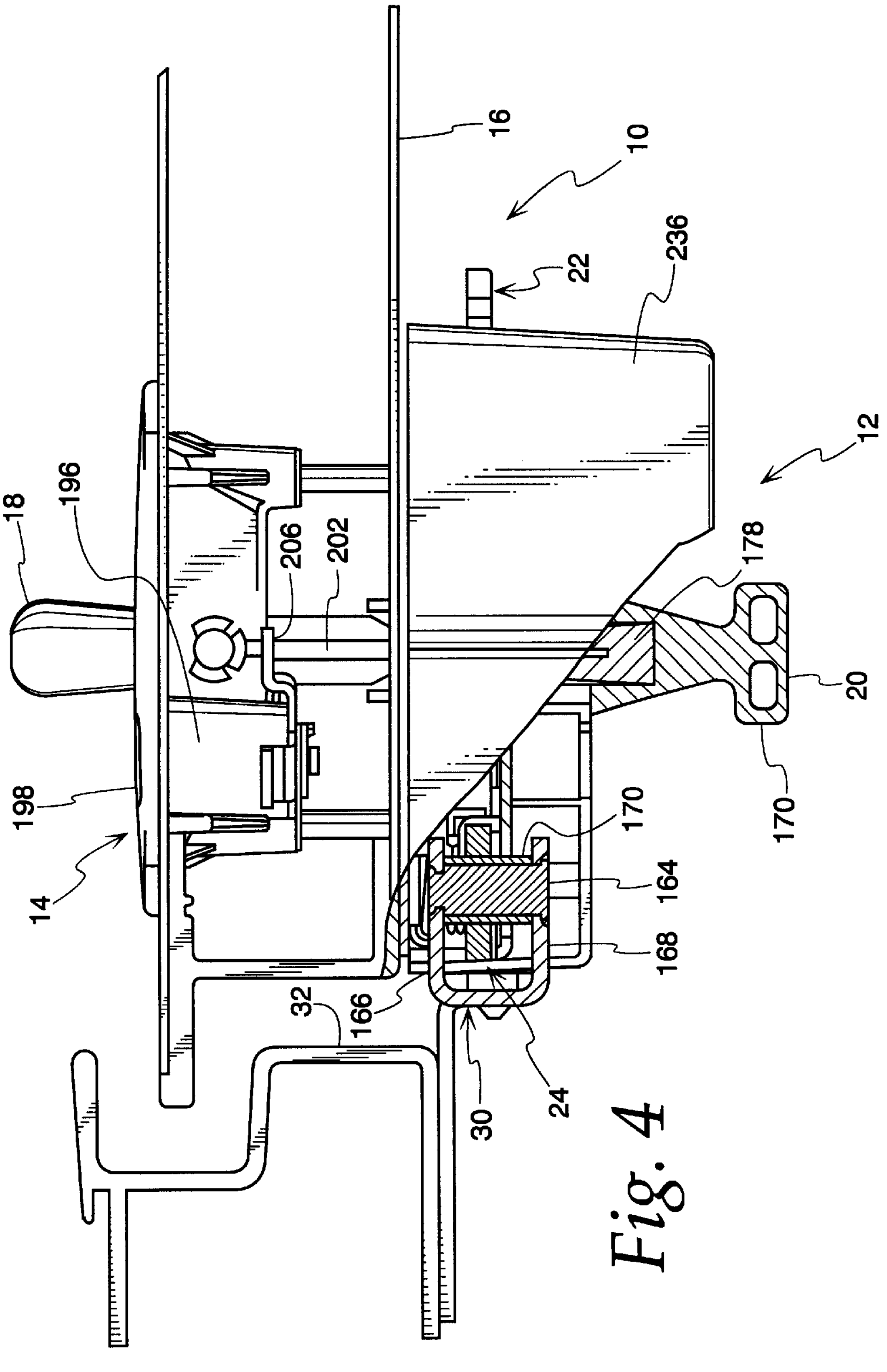
FIG. 4 is an enlarged, plan view of the inventive latch system in FIGS. 1–3 in an operative position on a closure element.
Figure 5:
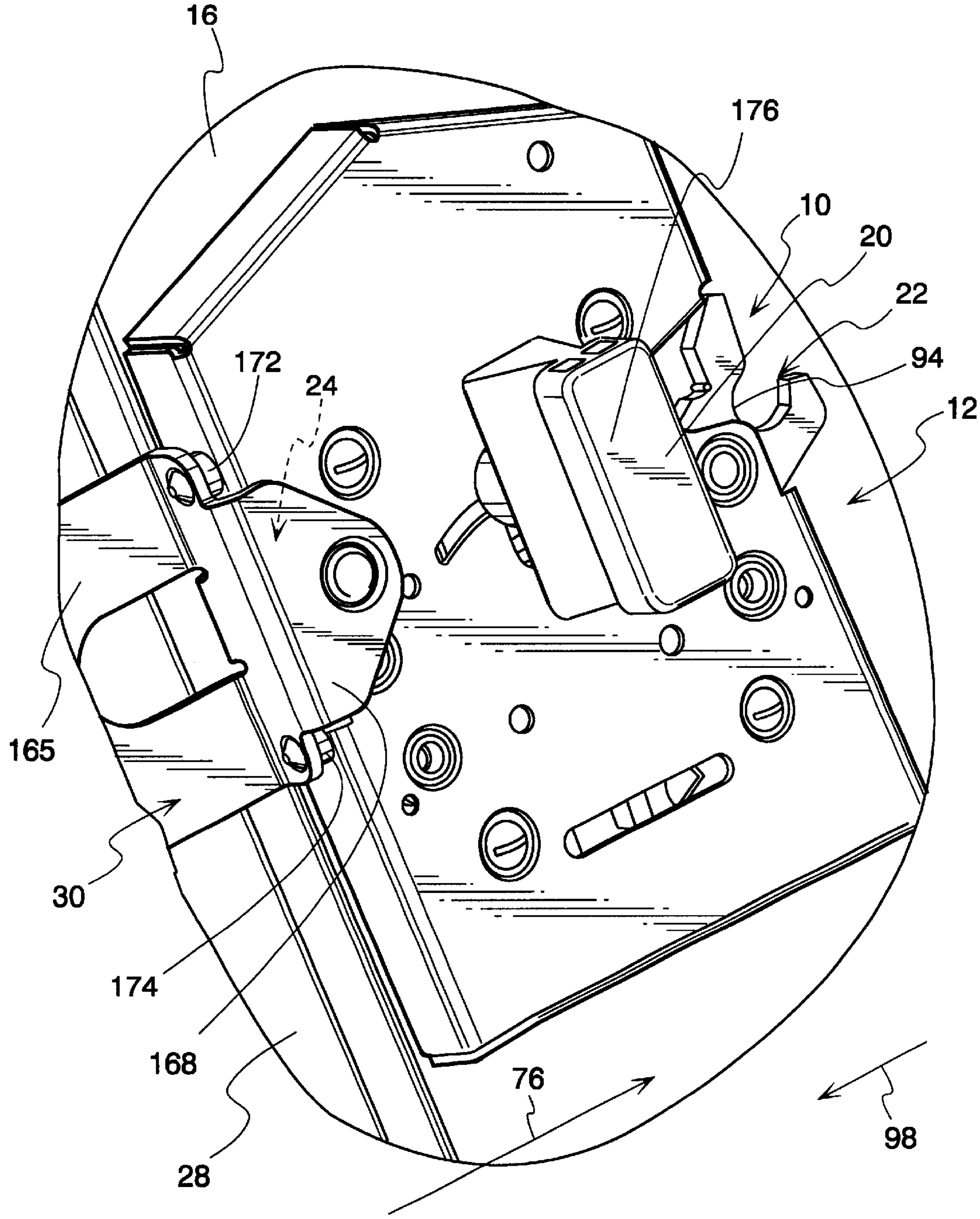
FIG. 5 is an enlarged, front perspective view of the interior latch portion in FIG. 1 mounted to a closure element and with a latch assembly thereon engaged with a strike element on a mounting frame to which the closure element is mounted.
Figure 6:
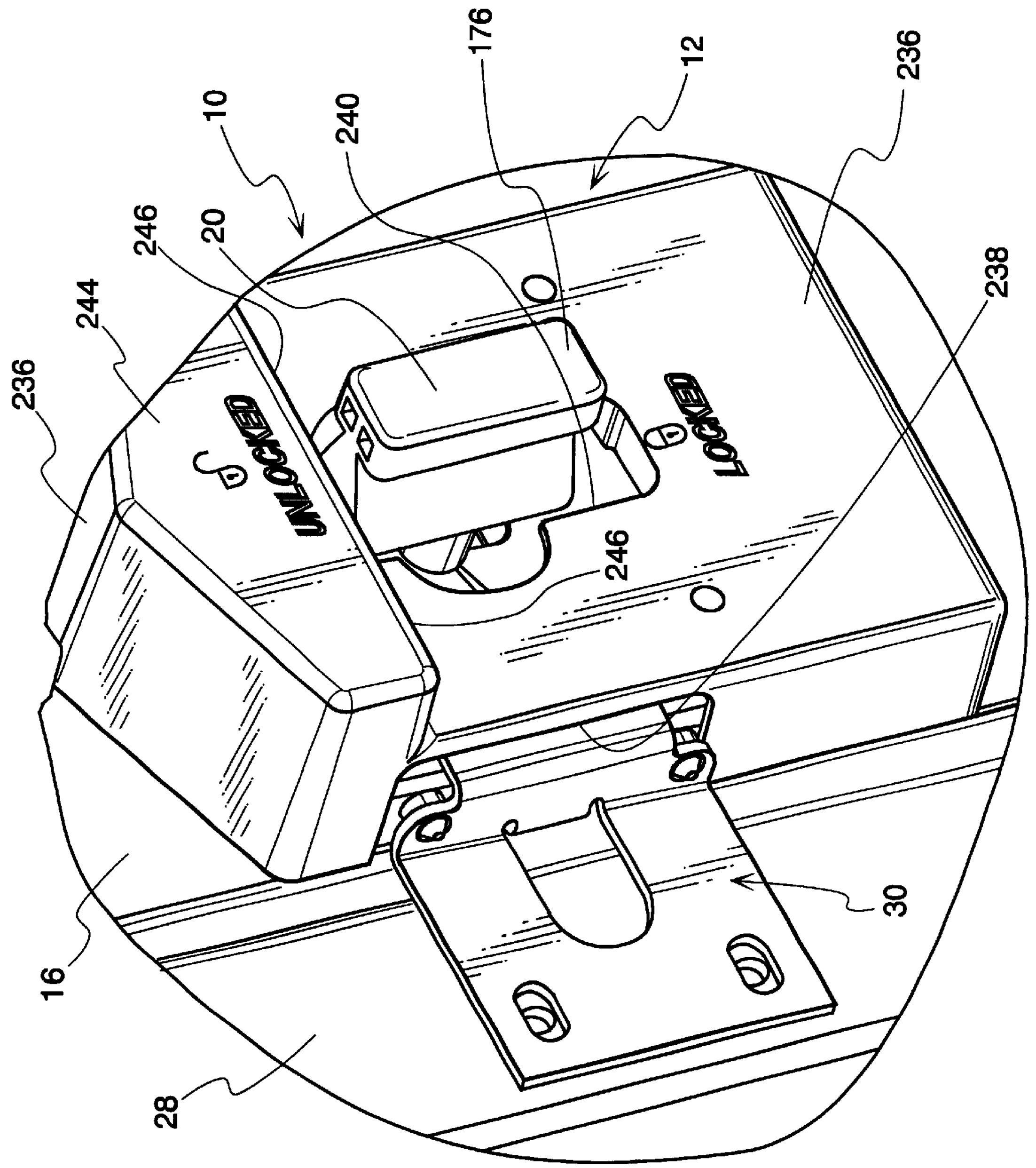
FIG. 6 is a view as in FIG. 5 with a cover installed over the interior latch system portion.
Figure 8:
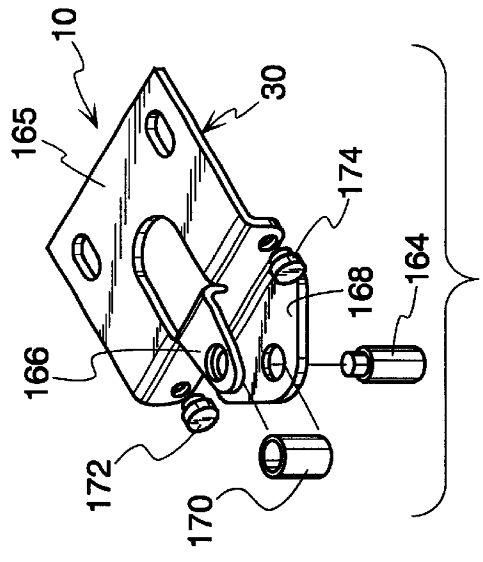
FIG. 8 is an enlarged, exploded perspective view of a strike assembly that is part of the inventive latch system.
Figure 7:
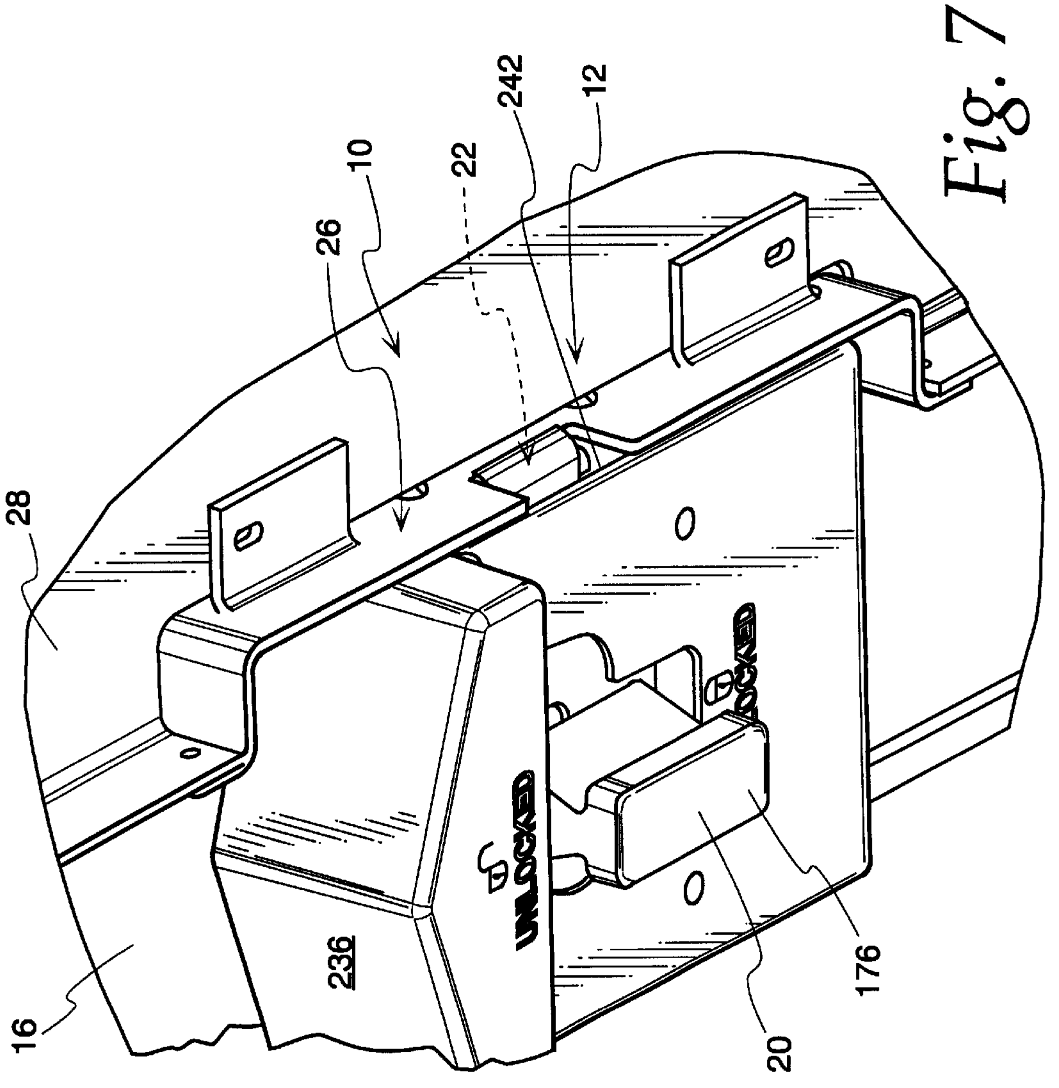
FIG. 7 is a view as in FIG. 6 with the closure moved to another position and a separate latch assembly on the latch system engaging a separate strike element on the mounting frame.
Figure 9:
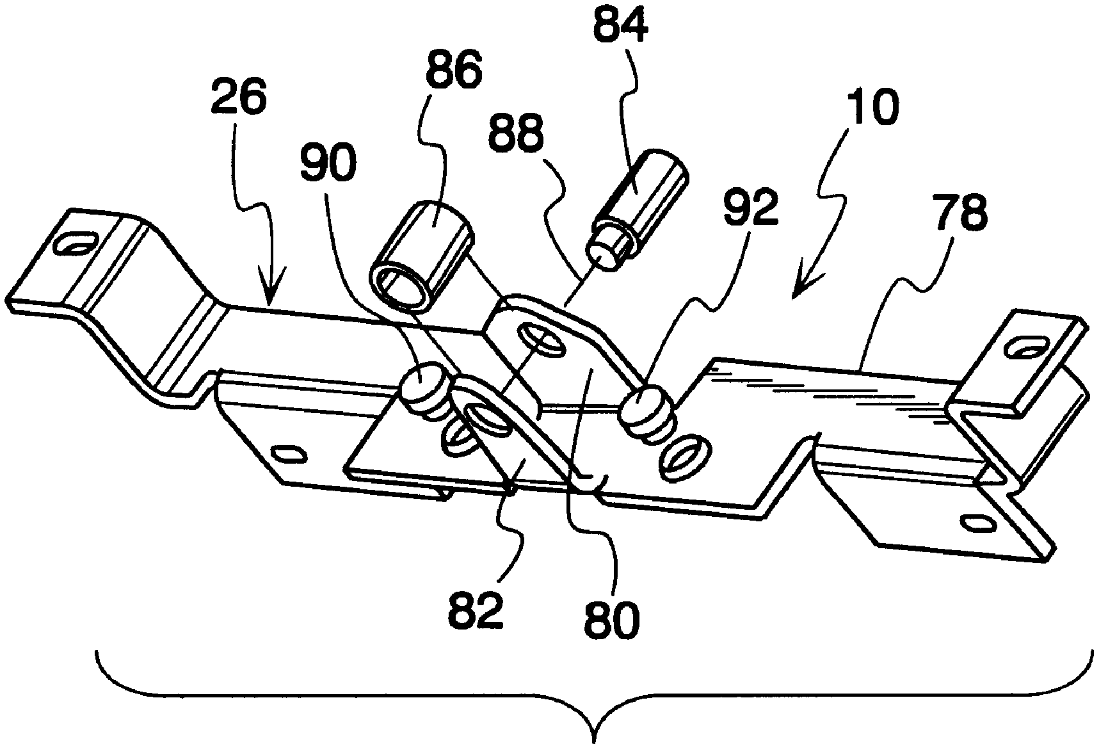
FIG. 9 is an enlarged, exploded, perspective view of another form of strike assembly, according to the present invention.
Figure 10:
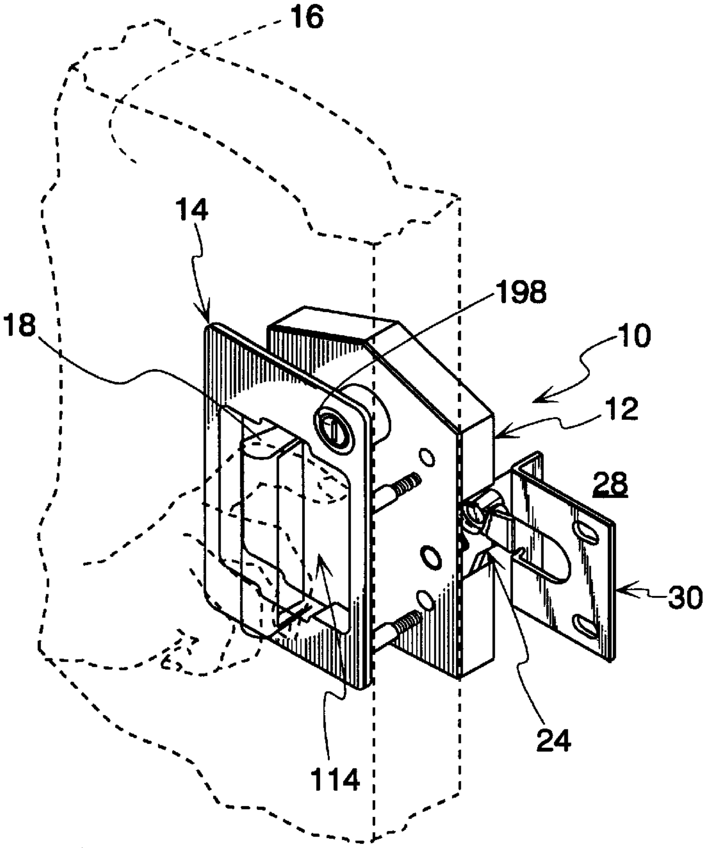
FIG. 10 is a reduced, perspective view of the inventive latch system in an operative state on a closure element and with the latch assembly being disengaged from a strike element.

Briefly, the latch system 10 is constructed to releasably maintain the closure element 16 in two different positions therefor. A first, closed position for the closure element 16 is shown in FIGS. 4–6. The latch assembly 24 cooperates with a strike assembly 30 that is part of the latch system 10 and fixed to a mounting frame 28 carrying the closure element 16. The closure element 16 is movable guidingly on the frame 28 in a translatory path between the first, closed position, shown in FIGS. 4–6, and a second, open position, shown in FIG. 7, wherein the latch assembly 22 cooperates with a separate strike assembly 26 that is also part of the latch system 10 and mounted to the frame 28.

It should be understood that the precise configuration of the closure element 16, an opening 32 bounded by the frame 28 and selectively exposed and blocked by the closure element 16, and the precise manner of movement of the closure element 16 between open and closed positions therefor, may vary considerably. The latch system 10 is typically suitable for a closure element, as shown, that is translatable substantially in a linear path between the closed and open positions, with the latch assembly 24 arranged to cooperate with the strike assembly 30 to releasably maintain the closure element in the closed position and the latch assembly 22 designed to cooperate with the strike assembly 26 to releasably maintain the closure element 16 in the open position.

Each of the latch assemblies 22, 24 has a similar construction. The latch assembly 22 is mounted within a frame part 34 on the interior latch portion 12, which frame part 34 consists of a cup-shaped housing 36 defining a receptacle 38 which is closed by a flat cover 40. The latch assembly 22 is mounted within the receptacle 38 to one side thereof and adjacent to a side opening 42 through the housing 36.

The latch assembly 22 has a conventional-type construction. The latch assembly 22 consists of a latch plate 44 and a cooperating latch cam 46. The latch plate 44 and latch cam 46 are mounted to the frame part 34 through axles 48, 50, respectively, which guide rotational movement of the latch plate 44 and latch cam 46 about spaced, parallel axes 52, 54. Through a torsion spring 56, the latch plate 44 is normally biased in the direction of the arrow 58 into a released position. The latch cam 46 is biased by a torsion spring 60 in the direction of the arrow 62 around the axis 54.

By pivoting the latch plate 44 from the position shown in FIG. 1 in a direction oppositely to that shown by the arrow 58, a projection 64 engages an arm 66 on the latch cam 46 to urge the latch cam 46 in pivoting movement around the axis 54 in a direction opposite to that indicated by the arrow 62. Continued pivoting of the latch plate 44 in this manner eventually causes the projection 64 to move beyond the arm 66, whereupon the spring 60 urges the latch cam 46 in the direction of the arrow 62 to seat the arm 66 in a notch 68 in the latch plate 44, whereupon the arm 66 prevents the latch plate 44 from moving under the force of the spring 56 in the direction of the arrow 58 from the latched position therefor into the released position, with the latter shown in FIG. 1. A corresponding latched state for the latch assembly 24 is shown in FIG. 1, which has a corresponding and reversed latch plate 70 and latch cam 72.

The latch assembly 22 is changed from the released state, shown in FIGS. 1 and 5, to the latched state therefor by the strike assembly 26 as the closure element 16 is moved in the direction of the arrow 76 up to and against the strike assembly 26. The strike assembly 26 has a plate 78 from which wall portions 80, 82 are struck and bent to produce a bifurcated end between which a strike bolt 84 is mounted. A cylindrical sleeve 86 surrounds the strike bolt 84, is captive between the wall portions 80, 82, and is rotatable around the central axis 88 of the strike bolt 84. The wall portions 80, 82 shield the strike bolt 84 and prevent hangup of foreign objects, such as a user's clothing, thereon. Resilient bumpers 90, 92 are provided to abut to the interior latch portion 12, as described below.

As the closure element 16 is advanced from the closed position therefor in the direction of the arrow 76 into the open position therefor, the strike bolt 84 and sleeve 86 move into a throat 94 on the latch assembly 22 with the latch assembly 22 in the released state. The strike bolt 84 and sleeve 86 progressively cam the latch plate 44 towards the latched position therefor until the closure element 16 assumes the open position and the latch assembly 22 realizes the latched state, in which the interior latch portion 12 abuts to the bumpers 90, 92. One arm 96 on the latch plate 44 abuts to the strike bolt 84 and sleeve 86 if an attempt is made to move the closure element 16 in the direction of the arrow 98 i.e. oppositely to the direction of the arrow 76 and towards the closed position. Movement of the closure element 16 in this manner cannot be effected until the latch assembly 22 is changed from the latched state into the released state, which is accomplished as described below.

Figure 11:
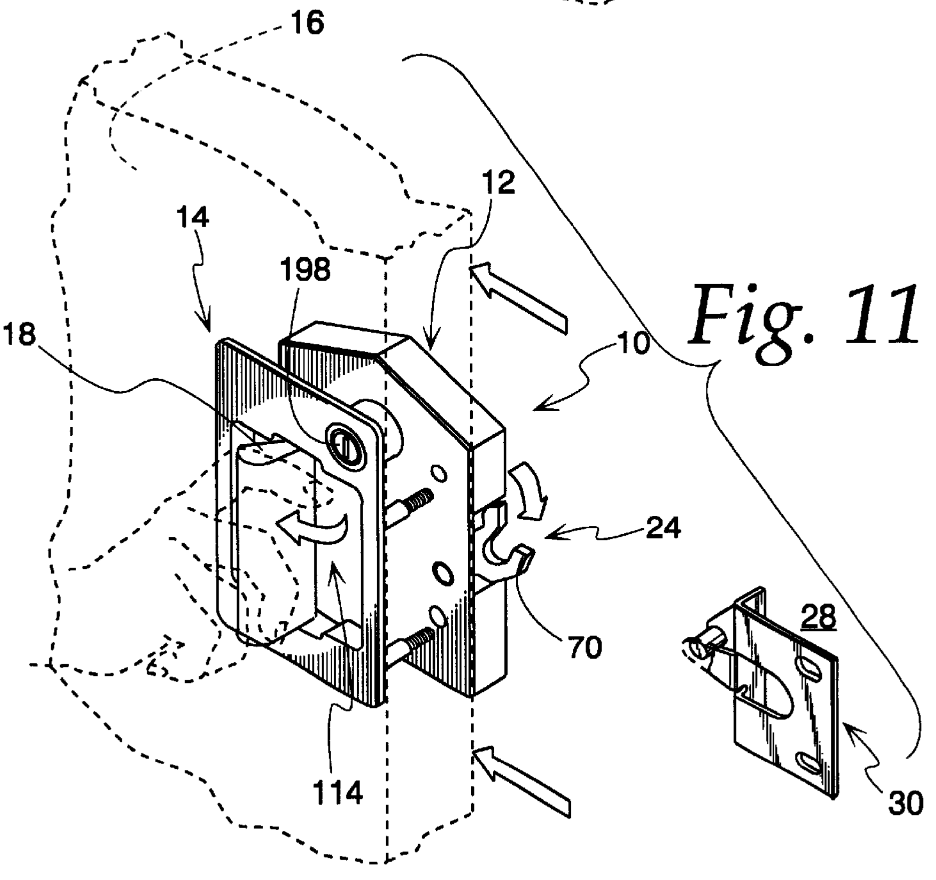
FIG. 11 is a view as in FIG. 10 with the second handle being manipulated to reposition the closure element.
Figure 12:
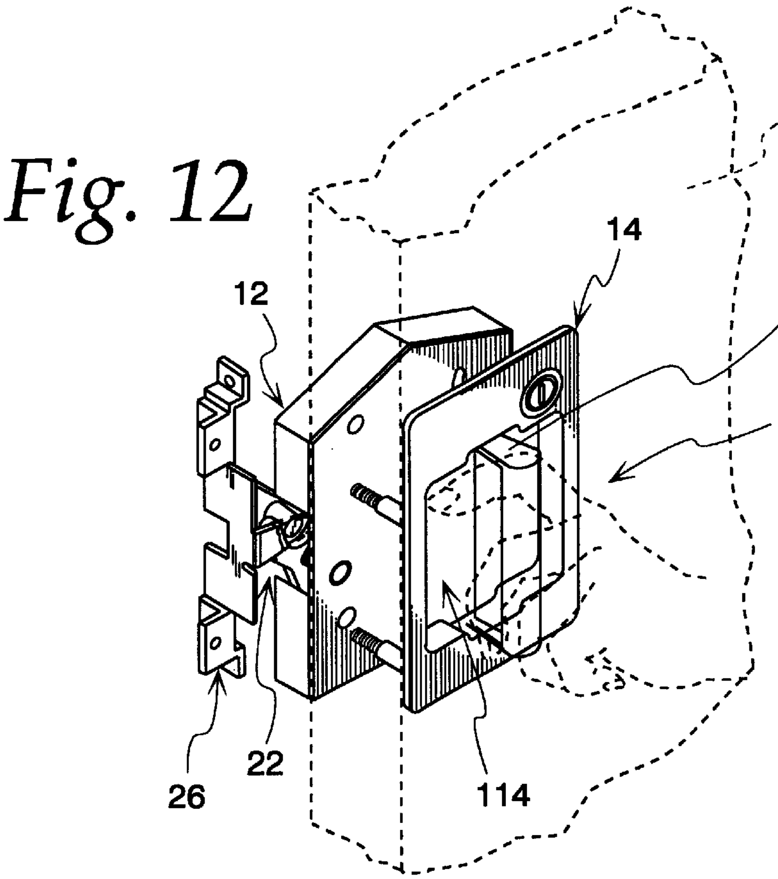
FIG. 12 is a view as in FIGS. 10 and 11 with a separate latch assembly being disengaged from a second strike element and the closure element moved toward another position.
Figure 13:
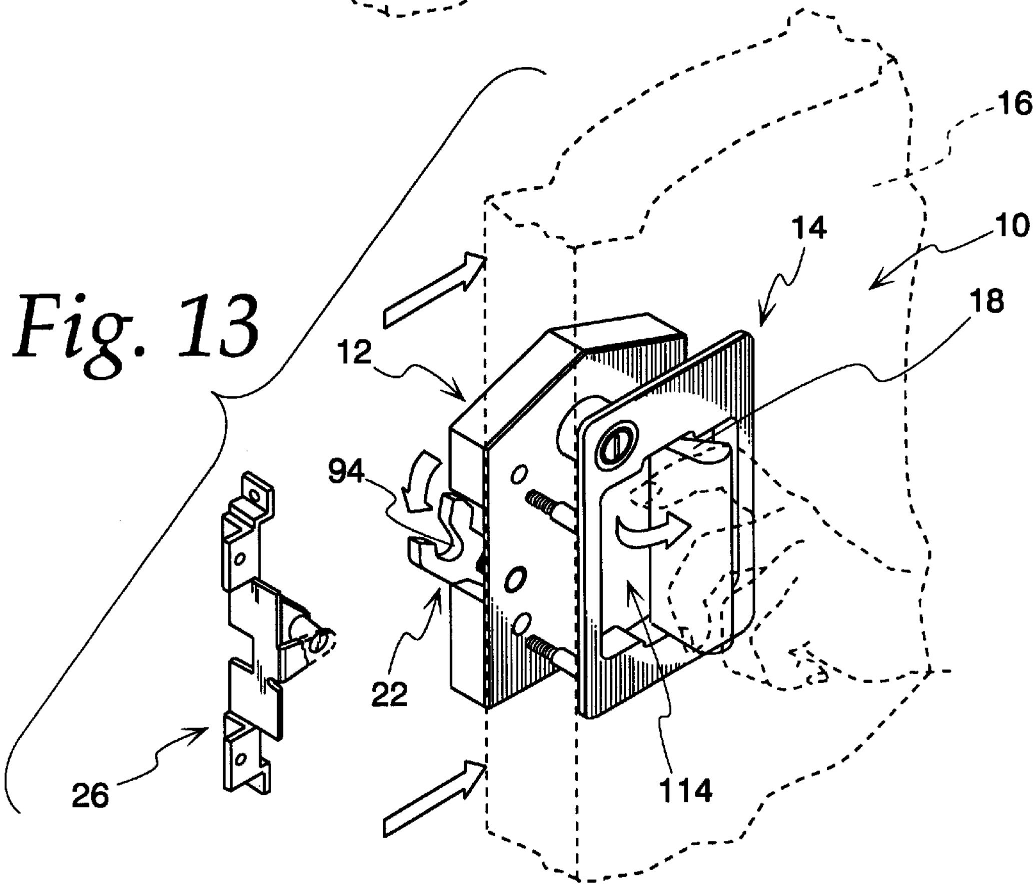
FIG. 13 is a view as in FIG. 12 with the second handle being manipulated to reposition the closure element.
Figure 15:
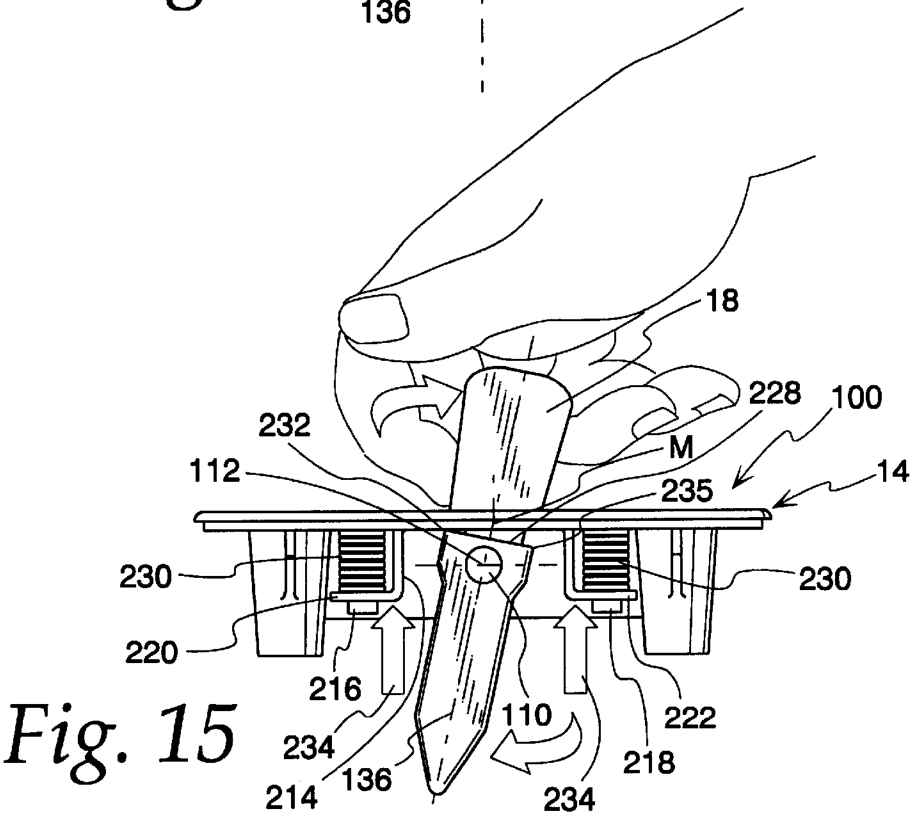
FIG. 15 is a view as in FIG. 14 with the second handle repositioned to effect actuation of one of the latch assemblies.

More particularly, the latch assembly 22 is changed from the latched state into the released state by operation of either handle 18, 20. The handle 18 is mounted to an external frame part 100 for movement between a first position, as shown in FIGS. 13 and 15, and a second position, as shown in FIG. 11. The handle 18 has an overall U-shaped configuration with a base 102 and spaced legs 104, 106. The legs 104, 106 are attached to the frame part 100 through pins 108, 110, which guide pivoting movement of the handle 18 around an axis 112 which is orthogonal to the line of movement of the closure element 16. The point of connection of the legs 104, 106 is recessed inwardly within a cup-shaped receptacle 114 formed in the frame part 100. The depth of the receptacle 114 can be selected to facilitate comfortable grasping of the handle 18 to effect operation thereof, preferably without permitting the user to "hang" from the handle. The receptacle 114 has spaced, V-shaped undercuts 116, 118 which define a working space for the legs 104, 106, as the handle 18 moves between the first and second positions therefor. With the handle 18 in the first position therefor, an edge 120 on a projection 122 on the leg 104 abuts to one side of a rib 124 on the frame part 100. As the handle 18 is moved from the first position into the second position therefor, another edge 126 on a spaced projection 128 on the leg 104 abuts to the other side of the rib 124. A like pair of projections are provided on the leg 106 in a similar fashion to produce a redundant stop arrangement for the handle 18. Movement of the handle 18 is arrested in both its first and second positions before an excessive force can be applied through the handle, to the rest of the mechanism, as hereinafter described, and before the handle 18 can make contact with the frame part 100 at a location within the undercuts 116, 118 that is visible and prone to being scratched or otherwise marred.

The handle 18, in the embodiment shown, is configured so that a user can conveniently reposition the handle 18 between the first and second positions therefor using his/her elbow, while holding packages, or the like, with both hands. This further facilitates loading and unloading of a storage area with which the closure element 16 is associated.

The leg 106 has an extension 136 which moves as one piece with the handle 18. The extension 136 projects through the closure element 16 and into an opening 138 on an actuator plate 140. The actuator plate 140 has an elongate slot 142 which receives a mounting pin 144 that attaches to the cover 40 in such a manner that the actuator plate 140 is guided by the pin 144 in translation along a line indicated by the double-headed arrow 146 and in rotation about the axis 147 of the pin 144. The actuator plate 140 has spaced actuator arms 148, 150 which move as one piece with the main body 152 of the actuator plate 140.

The actuator plate has tabs 154, 156 bent in the same direction from the body 152 to define facing actuating surfaces 158, 160 which are alternatingly engageable by the extension 136 as the handle 18 moves between the first and second positions therefor. For a thinner closure element the tabs 154, 156 can both be bent in a direction oppositely to that shown. As the handle 18 moves from the second position into the first position therefor, the extension 136 bears on the actuating surface 158 of the actuator plate 140, which causes the actuator plate 140 to pivot in the direction of the arrow 161 around the pin 144. As this occurs, the actuator arm 148 on the actuator plate 140 engages an actuator tab 162 on the latch cam 46 with the latch assembly 22 in the latched state, and thereby urges the latch cam 46 in rotation oppositely to the direction indicated by the arrow 62, releasing the arm 66 from the notch 68 and allowing the latch plate 44 to move from the latched position therefor into the released position.

To facilitate manufacture, the actuator plate 140 is shown to be made in two parts, with one part having each of the tabs 154, 156 and actuator arms 148, 150 thereon. The actuator plate 140, with the general configuration shown, could be formed as one piece.

With this arrangement, the handle 18 is moved from its second position to its first position by exerting a force having a component of substantial magnitude that is parallel to the direction of movement of the closure element 16 in the direction of the arrow 98. Thus, by grasping the handle 18, the user thereof can, in one motion, change the latch assembly 22 from the latched state into the released state to allow the latch assembly 22 to separate from the strike bolt 84 and sleeve 86, while at the same time urging the closure element from the open position therefor towards the closed position.

The handle 18 cooperates through the actuator plate 140 to change the latch assembly 24 from the latched state into the released state as the handle 18 is moved from the first position into the second position therefor. As the handle 18 is moved from the first position into the second position therefor, the extension 136 engages the actuator surface 160 on the actuator plate 140 to pivot the actuator plate 140 in a direction opposite to that indicated by the arrow 161, which causes the actuator arm 150 on the actuator plate 140 to engage and reposition the latch cam 72 to allow the latch plate 70 to move from the latched position into the released position therefor.

The latch plate 70 cooperates with a strike bolt 164 and sleeve 170 on the strike assembly 30 in the same manner that the latch plate 44 cooperates with the strike bolt 84 and sleeve 86. The strike assembly 30 has a similar construction to the strike assembly 26 and includes a plate 165 with spaced wall portions 166, 168 struck therefrom to define a bifurcated end to capture the strike bolt 164, which is likewise surrounded by a sleeve 170. The strike assembly 30 has bumpers 172, 174 which abut to the interior latch portion 12 to arrest movement of the closure element 16 in the closed position therefor. The plate 165 has a different configuration to facilitate its mounting to the frame 28, as the design thereof may dictate. The strike assemblies 26, 30 can be used interchangeably and therefore make the latch system 10 "no-handed" for use on, for example, both sides of a vehicle.

With this arrangement, a component of force that is used to move the handle 18 from the first position into the second position therefor is also aligned in the direction of the arrow 76 to change the position of the closure element 16 from the closed position towards the open position therefor.

The handle 20 consists of a graspable knob 176 which is press fit to a mounting tab 177 on the actuator plate 140 having a deformable tab 178 formed thereon. The deformable tab 178 can be accessed and deformed in a staking operation through an opening 179 in the knob 176 to thereby firmly hold the knob 176 in place. The knob 176 and actuator plate 140 thus move as one piece. The mounting tab 177 extends from the inside of the housing 36 through a T-shaped opening 180 to be exposed for attachment to the knob 176. A cross bar 182 on the slot 180 accommodates pivoting movement of the handle 20 around the axis 147 defined by the mounting pin 144. The handle 20 is movable between first and second positions corresponding to the first and second positions for the handle 18. The actuator plate 140, which is part of the handle 20, operates on the latch assemblies 22, 24 in the same manner, whether it is repositioned through the graspable knob 176 or handle 18. The cross bar 182 of the slot 180 can be dimensioned so that the movement of the handle 20 is arrested in the first and second positions therefor before undue stresses can be imparted to the remainder of the mechanism.

As the handle 20 is moved from its first position into its second position, with the latch assembly 24 engaged with the strike assembly 30, the latch assembly 24 is changed from its latched state into its released state to allow the latch assembly 24 to separate from the strike assembly 30. This same force has a component which imparts a movement to the closure element 16 in the direction of the arrow 76. Movement of the handle 20 from its second position into its first position changes the latch assembly 22 from its latched state into its released state, with the same operating force having a component tending to move the closure 16 in the direction of the arrow 76.

The interaction between the mounting pin 144 and actuator plate 140 is such that the actuator plate 140 is movable relative to the housing 36 and cover 40 in the line of the double-headed arrow 146. As the actuator plate 140 shifts in the line of the double-headed arrow 146, the mounting tab 177 can be moved into a stem portion 184 of the opening 180.

The cover 40 has a T-shaped slot 186 with a cross bar portion 188 and a stem portion 190. The tabs 154, 156 project into the slot 186 and move in the cross bar portion 188 as the handles 18, 20 move between the first and second positions therefor. The stem portion 190 accommodates the tabs 154, 156 as the actuator plate 140 is shifted in the line of the double-headed arrow 146.

Shifting of the actuator plate 140 in the line of the double-headed arrow 146 is carried out to lock the latch system 10. More particularly, the handle 20 is in a normal, operating position with the actuator plate 140 situated so that the mounting tab 177 resides in the cross bar 182 of the slot 180 and the tabs 154, 156 reside in the cross bar portion 188 of the slot 186. By shifting the handle 20, to include the knob 176 and actuator plate 140, in the direction of the arrow 191 in FIG. 1, the handle 20 is placed in a locked position, wherein the mounting tab 177 resides in the stem portion 184 of the opening 180 and the tabs 154, 156 reside in the stem portion 190 of the slot 186. As this occurs, the tab 177 on the actuator plate 140 becomes confined in the opening so that the actuator plate 140 is prevented from pivoting to allow the handles 18, 20 to move. The locked position can be readily visually detected by the user. Further, the positive locking of the actuator plate 140 against pivoting between the first and second positions can be tactily sensed by the user.

Figure 18:
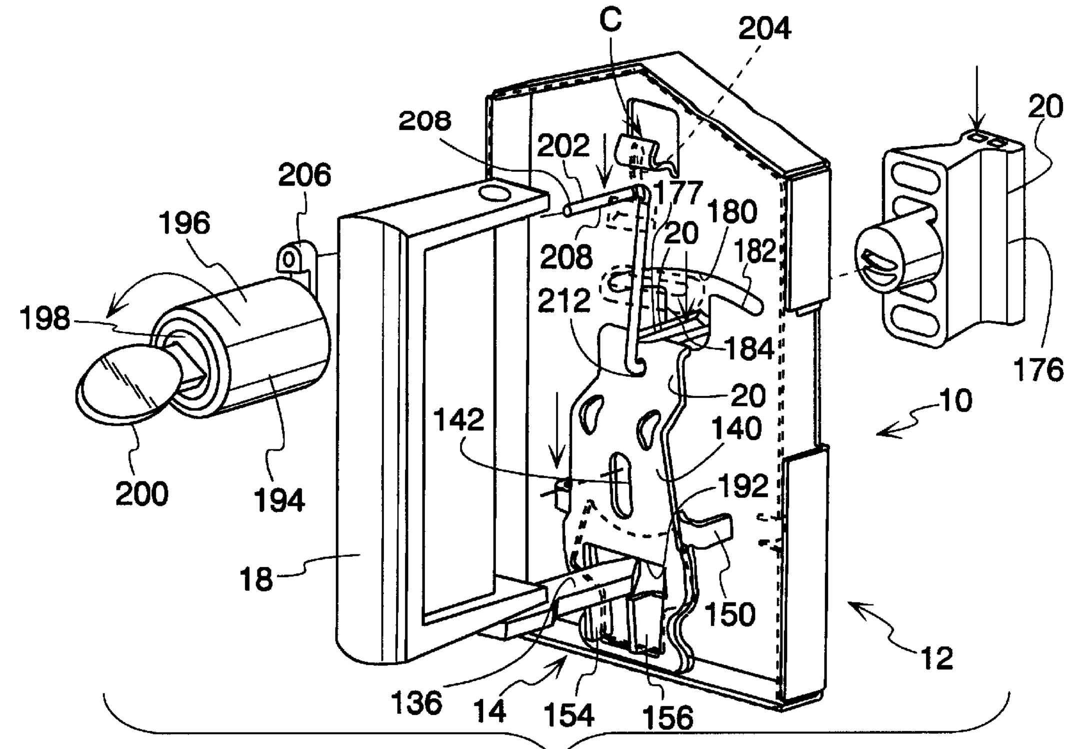
FIG. 18 is a view as in FIGS. 16 and 17 with the first handle moved to a locked position and disengaged from the second handle.
Figure 19:
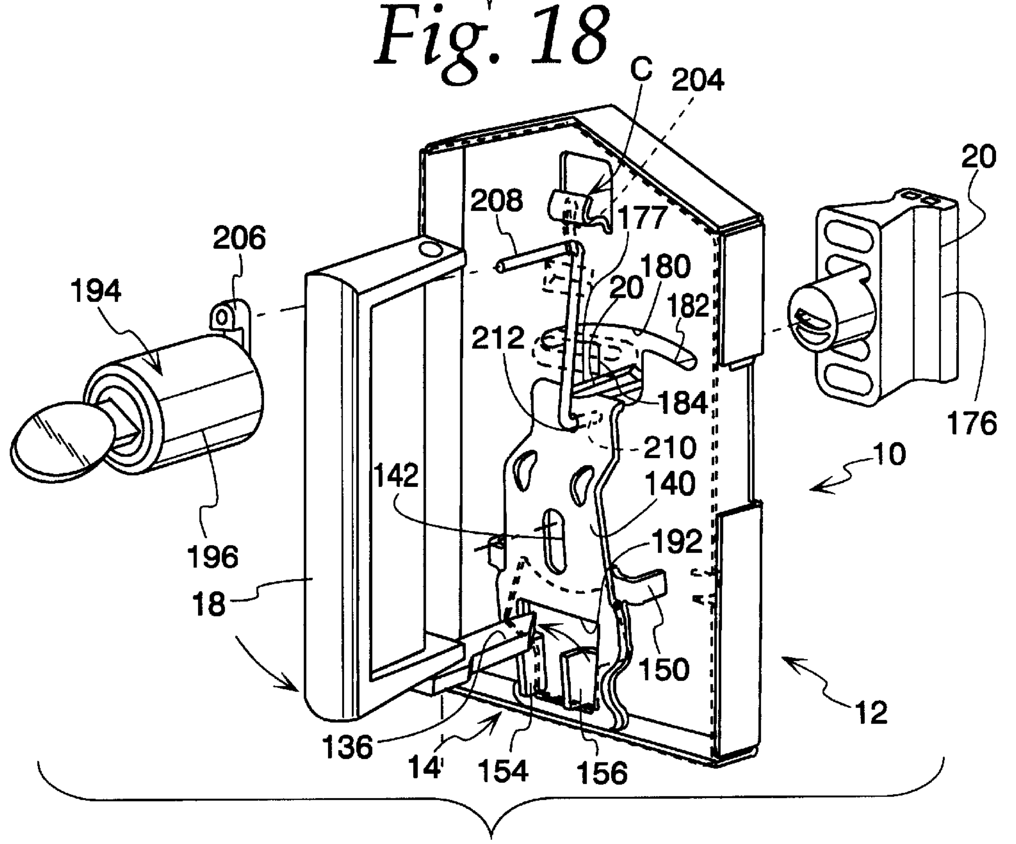
FIG. 19 is a view as in FIG. 18 with the second handle being repositioned without effecting movement of the first handle.

At the same time, as seen in FIGS. 18 and 19, the actuator plate 140 shifts so that the extension 136 moves from a position between the tabs 154, 156, with the handle 20 in its normal position, to a position wherein the extension 136 is spaced from the tabs 154, 156 to reside within an elongate slot portion 192 thereadjacent. The slot portion 192 is dimensioned so that the handle 18 can pivot freely between its first and second positions without any interaction with the handle 20 and thus without effecting any actuation of the latch assemblies 22, 24.

As a consequence, once the handle 20 is placed in the locked position and the overall latch system 10 is thereby locked, movement of the first handle 20 is positively prohibited by the housing 36. At the same time, any attempt to operate the latch system 10 through the handle 18 has no affect on the remainder of the mechanism as the handle 18 is moved through its full range of motion.

Consequently, there is no danger of imparting damage to the latch system 10 by reason of operating the handle 18 with the latch system 10 locked.

With this arrangement, the user on the inside of the closure element 16 can, with one hand, grasp the knob 176 and conveniently move the handle 20 to the locked position and, when desired, draw the handle 20 out of the locked position to the normal position and thereafter simply pivot the handle 20 through the knob 176 to effect operation of the latch assemblies 22, 24, and at the same time, through the same motion, shift the closure element 16 in the desired direction.

Figure 2:
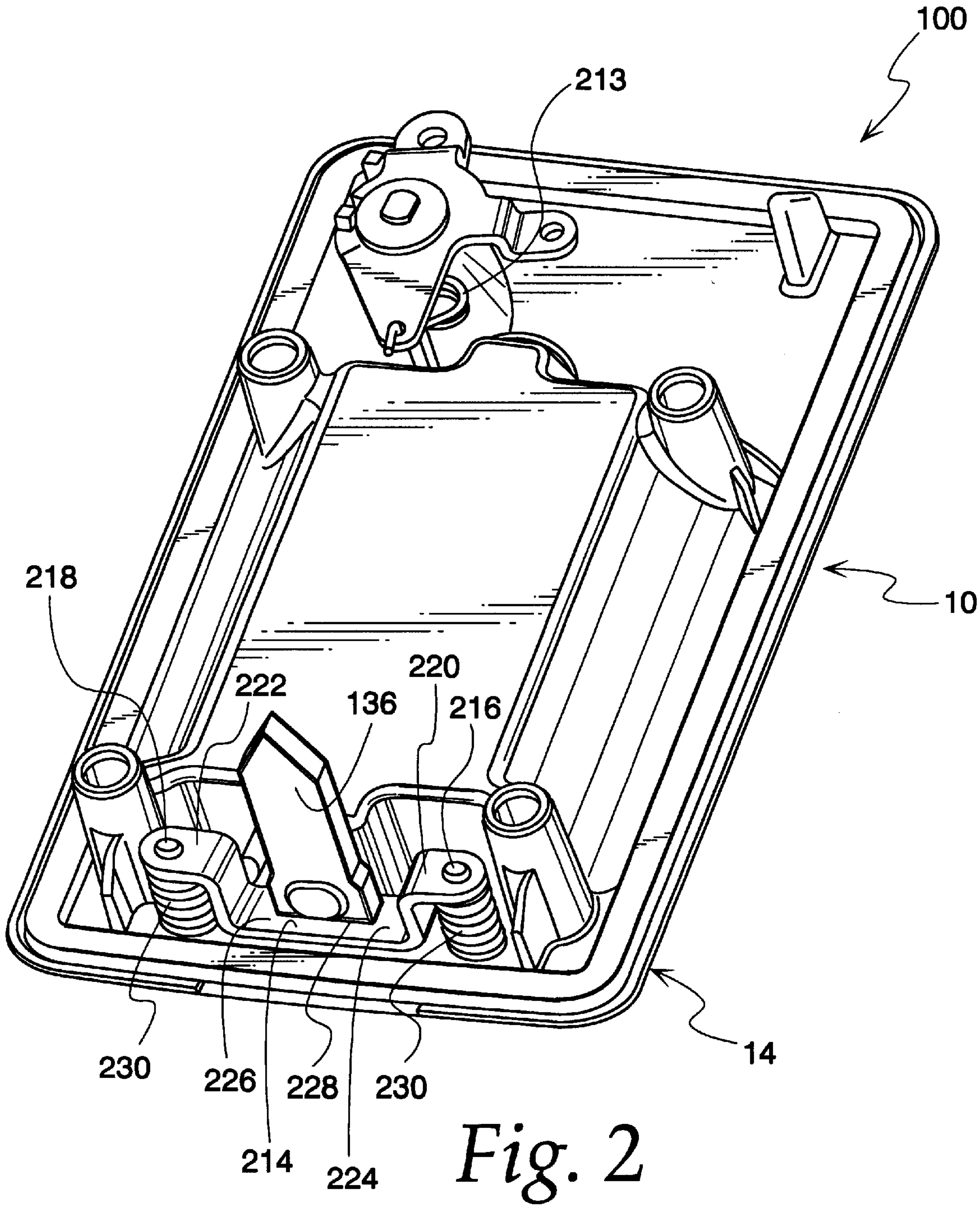
FIG. 2 is an enlarged, perspective view of an exterior portion of the inventive latch system, including a second frame part and second handle which cooperate with the interior latch system portion in FIG. 1.
Figure 3:
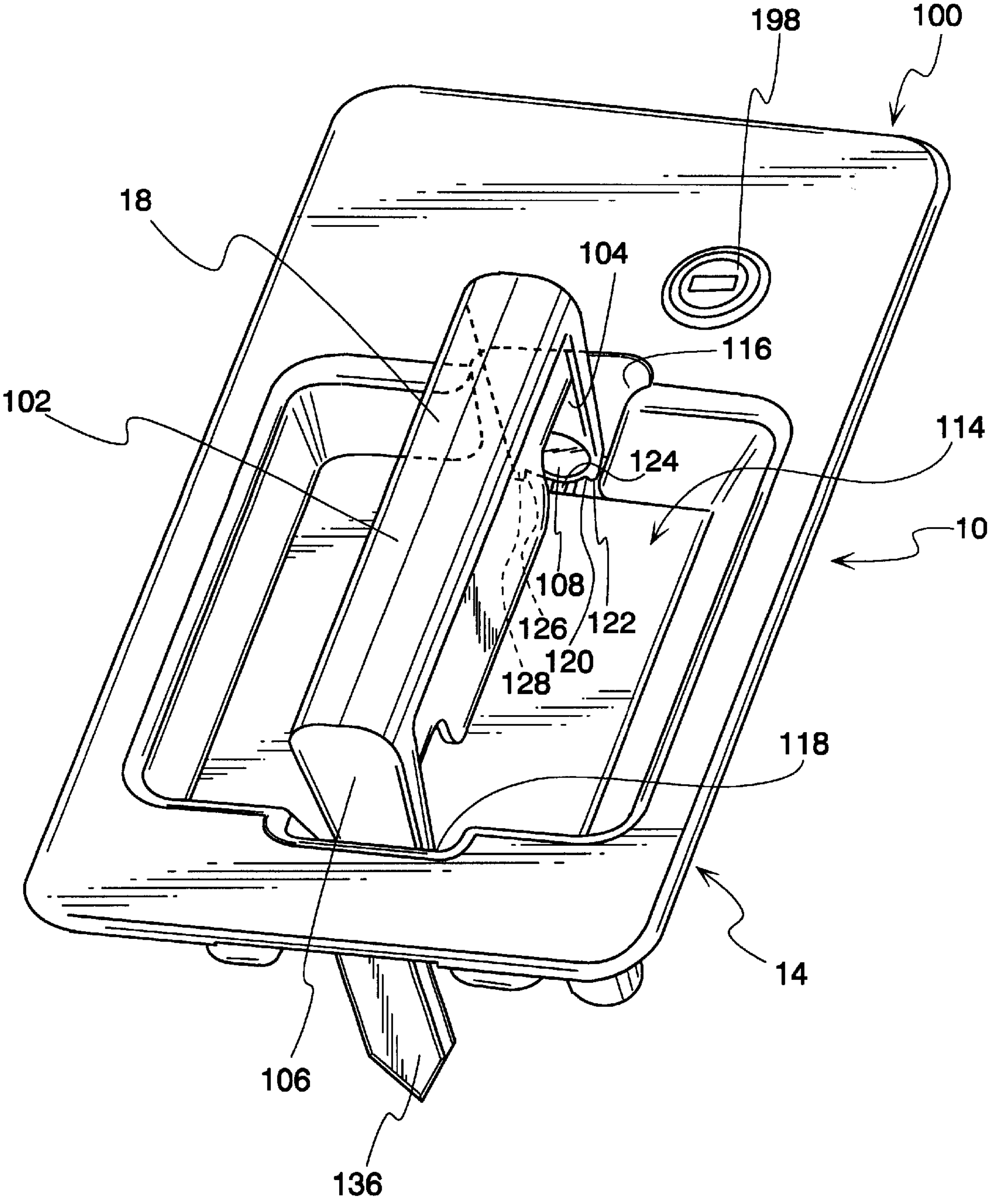
FIG. 3 is an enlarged, front, perspective view of the exterior latch portion in FIG. 2.
Figure 16:
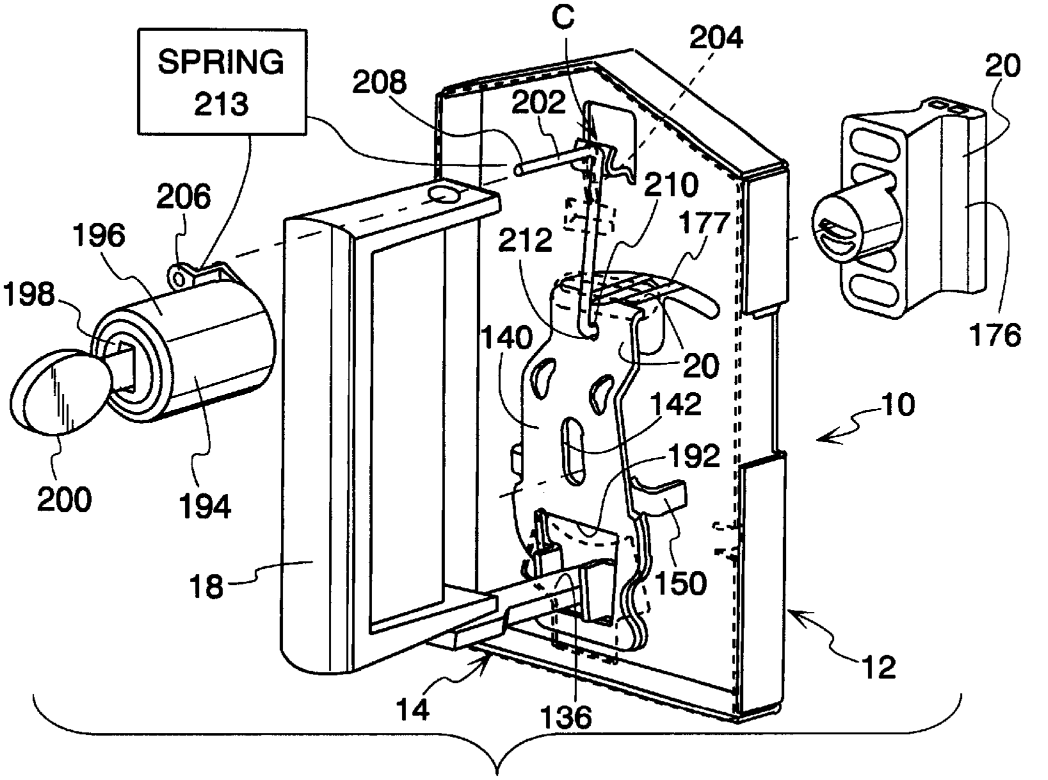
FIG. 16 is an exploded, perspective view of a part of the latch system and showing the relationship between the first and second handles, and a lock arrangement for selectively preventing operation of the latch system.
Figure 17:
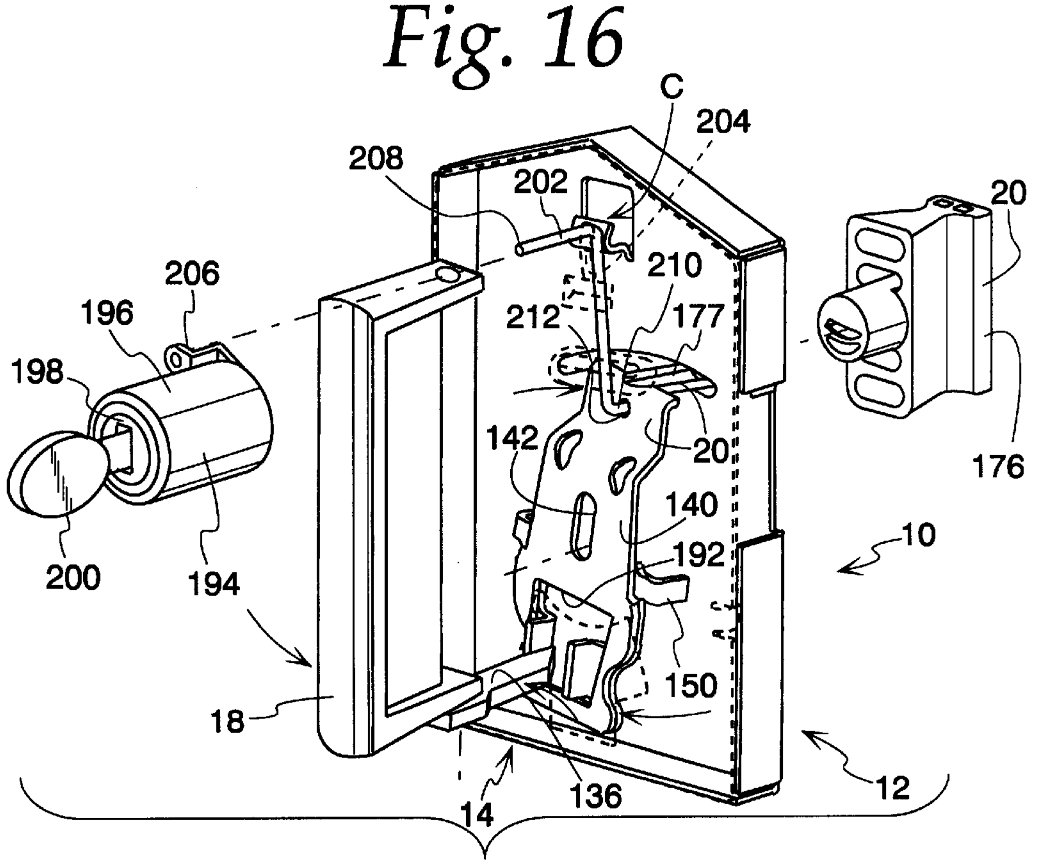
FIG. 17 is a view as in FIG. 16 with the second handle repositioned to effect operation of one of the latch assemblies.

Provision is also made to lock the latch system 10 from the exterior latch portion 14. A lock system 194 is provided on the exterior latch portion 14 and has a casing 196 which is mounted to the frame part 100. A rotatable cylinder 198 is mounted within the casing 196 and is operable through a conventional key 200. The cylinder 198 is rotatable through the key 200 to reposition a Z-shaped link 202 within a slot 204 in the cover 40. The lock cylinder 198 carries a tab 206 into which a free end 208 of the link 202 is extended. The opposite link end 210 fits within an opening 212 in the actuator plate 140. As the cylinder 198 is rotated from externally of the closure element 16, the link 202 is thereby shifted along the length of the slot 204 to reposition the first handle 20 between the locked and normal positions therefor. A torsion spring 213 (FIG. 2), shown schematically in FIG. 16, normally biases the tab 206 so as to urge the first handle 20 biasably and releasably into the unlocked position.

To stabilize and consistently locate the link 202 as it repositions, the cover 40 is staked at two locations A, B and the housing 36 is staked at a single location C such that the link 202 moves guidingly along and between the staked portion of the cover 40 and housing 36.

In an alternative system, a key system can rotate a plate (not shown) which directly engages the mounting tab 177 and drives the tab 177 and thus actuator plate 140 selectively oppositely to move the first handle 20 between the locked and unlocked positions therefor. The plate may have a "U"

shape with legs which alternatively engage the tab 177. A high security locking system can be constructed using this design.

Figure 14:
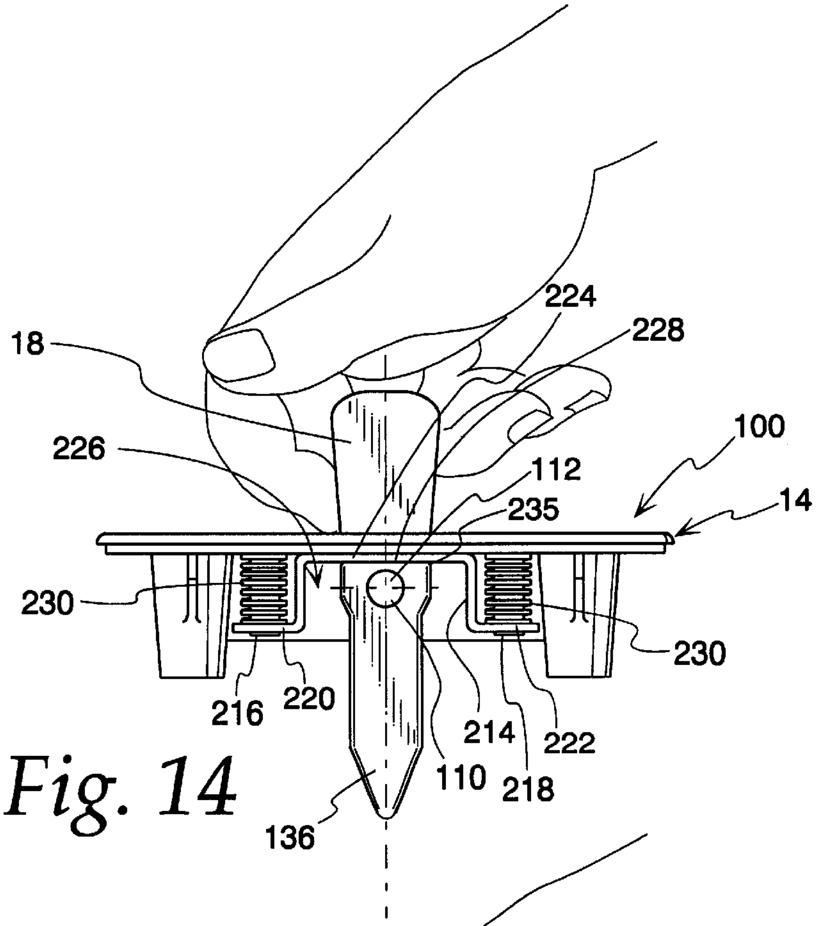
FIG. 14 is a plan view of the exterior latch portion with the second handle shown in a neutral position.

To facilitate movement of the handle 20 into the locked position therefor, and to place the latch system 10 in a ready state, both handles 18, 20 are normally biased to a neutral position, approximately midway between the first and second positions therefor, as shown, for example, in FIGS. 4 and 14.

To accomplish this, a U-shaped plate 214 is mounted on the frame part 100. The frame part 100 has posts 216, 218 which extend through outturned tabs 220, 222 in the plate 214 so that the plate 214 is thereby guided in a fore and aft direction relative to the frame part 100. The base 224 of the U-shaped plate 214 has a flat surface 226 which is facially abutted to a flat surface 228 on the extension 136 on the handle 18. The surfaces 226, 228 are arranged so that they facially abut with the handle 18 in the neutral position. A coil spring 230 surrounds each post 216, 218 and acts between the frame part 100 and the tabs 220, 222 to urge the plate surface 226 biasably against the flat surface 228 on the extension 130.

As the handle 18 is pivoted in one direction, one edge 232 thereon acts against the plate surface 226, thereby compressing the springs 230 and shifting the plate 214 in the direction of the arrows 234 in FIG. 15. Upon releasing the pivoted handle 18, the plate 214, under the force of the springs 230, urges the handle 18 back to the centered/neutral position. A spaced edge 235 on the extension 136 cooperates with the plate 214 in like fashion with the handle 18 pivoted oppositely to the one direction.

With this arrangement, the engagement point between the edges 232, 234 moves progressively closer to a point M on the surface 226 that is midway between the springs 230. As a result, the pivoting force that needs to be applied to the handle 18 remains relatively constant throughout its operating range.

A non-locking version of the latch system can be produced by eliminating the stem portion 184 of the opening 180 so that the actuator plate 140 cannot move in the line of the double-headed arrow 146 and the mounting tab 177 is confined to an arcuate path in the cross bar 182.

To improve the aesthetics on the interior latch portion 12, a cover/housing 236 can be provided. The cover/housing 236 surrounds substantially the entire interior latch portion 12 with openings 238, 240, 242 formed therethrough to accommodate the latch assemblies 22, 24 and prevent interference between those elements and the cover/housing 236.

The cover/housing 236 has an enlarged portion 244 defining a cantilevered surface 246 which projects over the handle 20. The surface 246 on the enlarged portion 244 act as a shield to prevent inadvertent contact with the handle 20, as might cause the handle 20 to shift from the normal position into the locked position therefor. The cover/housing 236 also shields the user from potential contact with the latch assemblies 22, 24 and strike assemblies 26, 30. Aside from the functional advantages, the cover/housing 236 may be made in a number of different shapes, colors, and textures to add aesthetically to the latch system 10.

The foregoing disclosure of specific embodiments is intended to be illustrative of the broad concepts comprehended by the invention.

What is claimed is:

1. A latch system for a closure element that is slidable relative to a mounting frame between first and second positions, the mounting frame having a strike element to be engaged to releasably maintain the closure element in the first position, the latch system comprising:

a first frame part that can be attached as a unit to a closure element;

a first handle that is mounted to the first frame part for movement between first and second positions;

a first latch assembly on the first frame part having a latched state and a released state, the first latch assembly in the latched state being capable of cooperating with the strike element to selectively prevent the closure element from moving from the first position for the closure element into the second position for the closure element, the first latch assembly in the released state permitting the closure element to move from the second position for the closure element into the first position for the closure element and from the first position for the closure element into the second position for the closure element, whereby as the first handle is moved from the first position for the first handle into the second position for the first handle, the first handle causes the first latch assembly to change from the latched state into the released state, the first handle being movable from the first position for the first handle into the second position for the first handle by exerting a force on the first handle in a first direction, the first frame part, first handle, and first latch assembly being capable of being mounted in an operative position on the closure element so that a force exerted on the first handle in the first direction to move the first handle from the first position for the first handle into the second position for the first handle has at least a component thereof tending to move the closure element from the first position for the closure element toward the second position for the closure element, whereby with the first frame part, first handle and first latch assembly in the operative position on the closure element with the closure element in the first position for the closure element and the latch assembly in the latched state, a user can exert a force on the first handle in the first direction that both a) changes the first latch assembly from the latched state into the released state and b) urges the closure element from the first position for the closure element towards the second position for the closure element; and a second latch assembly on the first frame part and having a latched state and a released state, the second latch assembly in the latched state for the second latch assembly being capable of cooperating with a second strike element on the mounting frame to selectively prevent the closure element from moving from the second position for the closure element into the first position for the closure element, the second latch assembly in the released position for the second latch assembly permitting the closure element to move from the first position for the closure element into the second position for the closure element and from the second position for the closure element into the first position for the closure element.

2. The latch system for a closure element according to claim 1 further comprising a strike element to be releasably engaged by the first latch assembly.

3. The latch system for a closure element according to claim 2 in combination with a mounting frame and a closure element which is mounted for sliding movement relative to the mounting frame between first and second positions, the first frame part, first handle, and first latch assembly being mounted in an operative position on the closure element, the strike element being attached to the mounting frame to be releasably engaged by the first latch assembly.

4. The latch system for a closure element according to claim 3 wherein the closure element is translatable in a first line between the first and second positions for the closure element, the first handle is pivotable about a first axis in moving between the first and second positions for the first handle, and the first axis and first line are substantially orthogonal to each other.

5. The latch system for a closure element according to claim 4 wherein the first line extends in one of a horizontal and vertical direction and the first axis extends substantially in the one of the horizontal and vertical directions.

6. The latch system for a closure element according to claim 4 wherein the first line extends in one of a horizontal and vertical direction and the first axis extends substantially in the other of the horizontal and vertical directions.

7. The latch system for a closure element according to claim 1 wherein as the first handle is moved from the second position for the first handle into the first position for the first handle the first handle causes the second latch assembly to change from the latched state for the second latch assembly into the released state for the second latch assembly, the first handle being movable from the second position for the first handle into the first position for the first handle by exerting a force on the first handle in a second direction, the first frame part, first handle, first latch assembly, and second latch assembly being capable of being mounted in an operative position on the closure element so that a force exerted on the first handle in the second direction to move the first handle from the second position for the first handle into the first position for the first handle has at least a component thereof tending to move the closure element from the second position for the closure element toward the first position for the closure element, whereby with the first frame part, first handle, first latch assembly and second latch assembly in the operative position on the closure element with the closure element in the second position for the closure element and the second latch assembly in the latched state for the second latch assembly a user can exert a force on the first handle in the second direction that both a) changes the second latch assembly from the latched state for the second latch assembly into the released state for the second latch assembly and b) urges the closure element from the second position for the closure element towards the first position for the closure element.

8. The latch system for a closure element according to claim 1 wherein the latch system further comprises a second frame part and a second handle that is mounted to the second frame part for movement between first and second positions, so that as the second handle is moved from first position for the second handle into the second position for the second handle, the second handle thereby causes the first latch assembly to change from the latched state for the first latch assembly into the released state for the first latch assembly.

9. The latch system for a closure element according to claim 8 wherein the second handle is movable from the first position for the second handle into the second position for the second handle by exerting a force on the second handle in a second direction, the first frame part, first handle, second frame part, second handle, and first latch assembly being capable of being mounted in an operative position on the closure element so that a force exerted on the second handle in the second direction to move the second handle from the first position for the second handle into the second position for the second handle has at least a component thereof tending to move the closure element from the first position for the closure element toward the second position for the closure element, whereby with the first frame part, first handle, second frame part, second handle, and first latch assembly in the operative position on the closure element with the closure element in the first position for the closure element and the latch assembly in the latched state a user can exert a force on the second handle in the second direction that both a) changes the first latch assembly from the latched state into the released state and b) urges the closure element from the first position for the closure element towards the second position for the closure element.

10. The latch system for a closure element according to claim 8 wherein the first handle is pivotable around a first axis in moving between the first and second positions for the first handle, the second handle is pivotable around a second axis in moving between the first and second positions for the second handle, and the first and second axes are non-parallel.

11. The latch system for a closure element according to claim 10 wherein the first and second axes are substantially orthogonal to each other.

12. The latch system for a closure element according to claim 8 wherein the first and second handles are interconnected, each to the other so that movement of the first handle from the first position for the first handle into the second position for the first handle causes the second handle to move from the first position for the second handle into the second position for the second handle and movement of the second handle from the first position for the second handle into the second position for the second handle causes the first handle to move from the first position for the first handle into the second position for the first handle.

13. The latch system for a closure element according to claim 12 wherein the first handle is selectively repositionable relative to the first frame part and second handle between a normal position and a locked position and with the first handle in the locked position the first handle is disengaged from the second handle so that the second handle can be moved from the first position for the second handle into the second position for the second handle without causing the first handle to be moved from the first position for the first handle into the second position for the first handle.

14. The latch system for a closure element according to claim 13 wherein with the first handle in the locked position the first frame part and first handle cooperate to prevent the first handle from moving between the first and second positions for the first handle.

15. The latch system for a closure element according to claim 13 wherein with the first handle in the locked position, the second handle is disengaged from the first latch assembly so that the second handle can be moved from the first position for the second handle into the second position for the second handle without causing the first latch assembly to change from the latched state into the released state.

16. The latch system for a closure element according to claim 13 wherein there is an actuator on the second frame part, and the actuator is operable to reposition the first handle between the normal and locked positions.

17. The latch system for a closure element according to claim 16 wherein the actuator is key operable.

18. The latch system for a closure element according to claim 8 in combination with a closure element having first and second oppositely facing sides, the first frame part is mounted on the first oppositely facing side of the closure element and the second frame part is mounted on the second oppositely facing side of the closure element.

19. The latch system for a closure element according to claim 13 wherein the first handle is translatable between the normal and locked positions.

20. The latch system for a closure element according to claim 1 wherein the first handle abuts to the first frame part with the first handle in at least one of the first and second positions for the first handle.

21. The latch system for a closure element according to claim 1 wherein the first handle abuts to the first frame part with the first handle in each of the first and second positions for the first handle.

22. The latch system for a closure element according to claim 1 wherein the first frame part has a recess in which at least a part of the first handle resides.

23. The latch system for a closure element according to claim 22 wherein the recess is cup-shaped to receive a part of a user's hand which engages the first handle to reposition the first handle between the first and second positions for the first handle.

24. The latch system for a closure element according to claim 2 wherein the strike element comprises a strike bolt having a vertical axis and axially spaced ends and a plate assembly with spaced wall portions between which the strike bolt extends so that each axially spaced end of the strike bolt is adjacent to one of the wall portions.

25. The latch system for a closure element according to claim 19 wherein there is a cantilevered surface which shields the first handle to avoid inadvertent repositioning of the first handle between the normal and locked positions.

26. The latch system for a closure element according to claim 1 wherein there is a spring assembly which urges the first handle to a neutral position between the first position for the first handle and the second position for the first handle.

27. The latch system for a closure element according to claim 26 wherein the first handle has a first edge, the spring assembly comprises a plate and first and second spaced springs which act between the first frame part and plate to urge the plate in one direction against the first handle and as the first handle is moved from the neutral position towards one of the first and second positions for the first handle the first edge acts against the plate to urge the plate oppositely to the one direction.

28. The latch system for a closure element according to claim 27 wherein the plate has a midpoint that is spaced equidistantly from the first and second springs and the first edge moves closer to the midpoint as the first handle moves from the neutral position towards the one of the first and second positions for the first handle.

29. The latch system for a closure element according to claim 27 wherein the springs comprise coil springs.

30. The latch system for a closure element according to claim 1 wherein the first handle has a U-shaped configuration with a base and spaced legs and the spaced legs are pivotably connected to the first frame part to allow the first handle to pivot between the first and second positions for the first handle.

31. A latch system for a closure element that is movable relative to a mounting frame between first and second positions, the frame having a strike element to be engaged to releasably maintain the closure element in the first position, the latch system comprising:

a first frame part; and a first handle that is mounted to the first frame part for movement between first and second positions, a first latch assembly having a latched state and a released state, the first latch assembly in the latched state being capable of cooperating with the strike element to selectively prevent the closure element from moving from the first position for the closure element into the second position for the closure element, whereby as the first handle is moved from the first position for the first handle into the second position for the first handle, the first handle causes the first latch assembly to change from the latched state into the released state, wherein the first handle is selectively repositionable between a normal position and a locked position, the first handle being movable between the first and second positions for the first handle with the first handle in the normal position, the first handle cooperating with the first frame part so that the first frame part prevents the first handle from moving between the first and second positions with the first handle in the locked position.

32. The latch system for a closure element according to claim 31 wherein the first handle has an exposed portion to be engaged by a user that is a) pivotable about an axis in a first path to move the handle between the first and second positions for the first handle and b) translatable in a second path to reposition the first handle between the normal and locked positions.

33. The latch system for a closure element according to claim 32 wherein the first and second paths cooperatively define a T shape.

34. The latch system for a closure element according to claim 31 further comprising a second frame part and a second handle that is mounted to the second frame part for movement between first and second positions, as the second handle moves from the first position for the second handle into the second position for the second handle the second handle causes the first latch assembly to change from the latched state into the released state.

35. The latch system for a closure element according to claim 34 wherein with the first handle in the normal position the first and second handles are interconnected, each to the other so that movement of the first handle from the first position for the first handle into the second position for the first handle causes the second handle to move from the first position for the second handle into the second position for the second handle, and movement of the second handle from the first position for the second handle into the second position for the second handle causes the first handle to move from the first position for the first handle into the second position for the first handle, and with the first handle in the locked position the second handle is disengaged so that the second handle can be moved from the first position for the second handle into the second position for the second handle without causing the first latch assembly to change from the latched state into the released state.

* * * * *